(12) United States Patent
Peh et al.

(10) Patent No.: US 7,963,871 B2
(45) Date of Patent: Jun. 21, 2011

(54) BICYCLE FRONT DERAILLEUR WITH ANGLE ADJUSTMENT

(75) Inventors: Peter Peh, Jurong Town (SG); Ken Eu, Jurong Town (SG)

(73) Assignee: Shimano Singapore Pte., Ltd., Jurong Town (SG)

( * ) Notice: Subject to any disclaimer, the term of this patent is extended or adjusted under 35 U.S.C. 154(b) by 580 days.

(21) Appl. No.: 11/287,353

(22) Filed: Nov. 28, 2005

(65) Prior Publication Data

US 2007/0123379 A1 May 31, 2007

(51) Int. Cl.
*B62M 9/12* (2006.01)
(52) U.S. Cl. .......................................................... 474/82
(58) Field of Classification Search ................ 474/80, 474/82
See application file for complete search history.

(56) References Cited

U.S. PATENT DOCUMENTS

| | | | |
|---|---|---|---|
| 4,199,997 A * | 4/1980 | Isobe ............................... 474/82 |
| 4,199,998 A | 4/1980 | Isobe | |
| 4,486,182 A * | 12/1984 | Coue ............................... 474/80 |
| 4,516,961 A | 5/1985 | Coue | |
| 4,617,006 A * | 10/1986 | Nagano ........................... 474/80 |
| 5,846,148 A | 12/1998 | Fujii | |
| 6,009,771 A | 1/2000 | Desenclos et al. | |
| 2005/0204846 A1* | 9/2005 | Valle et al. ....................... 74/469 |

FOREIGN PATENT DOCUMENTS

EP   1 547 914 A2   6/2005

* cited by examiner

*Primary Examiner* — Robert Siconolfi
*Assistant Examiner* — Stephen Bowes
(74) *Attorney, Agent, or Firm* — Global IP Counselors, LLP

(57) ABSTRACT

A bicycle front derailleur includes a base member, a movable member, and a chain guide with an angle adjustable plate member. The base member is configured to be coupled to a portion of a bicycle. The movable member has a first support side coupled to the base member and a second support side spaced from the first support side. The movable member is configured to move the second support side between a retracted position and an extended position relative to the base member. The angle adjustable plate member is coupled to the second support side for movement therewith. The chain guide includes a chain cage with the angle adjustable plate member operatively coupled to selectively adjust an angular orientation of the chain cage relative to the angle adjustable plate member.

14 Claims, 13 Drawing Sheets

BICYCLE FRONT DERAILLEUR WITH ANGLE ADJUSTMENT

BACKGROUND OF THE INVENTION

1. Field of the Invention

The present invention generally relates to a bicycle front derailleur with angle adjustment. More specifically, the present invention relates to a bicycle front derailleur with an adjustment mechanism that provides angular adjustment of a chain cage of the front derailleur with respect to the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur.

Generally speaking, the front derailleur is typically secured to the seat tube of the bicycle frame or the bottom bracket. Basically, a front derailleur includes a base (fixed) member non-movably secured to a bicycle frame, a movable member supported to be movable relative to the base member and a chain guide. Typically, the base member is a tubular clamping member that is secured to the seat tube. The movable member typically is formed of a pair of pivotal links that form a four-bar linkage with the base member and the chain guide. The chain guide typically has chain cage with a pair of cage plates for contacting and moving a chain between front sprockets of a bicycle drive train. The chain guide is usually biased in a given direction relative to the base member by a spring. The chain guide is usually moved relative to the base member by pulling and/or releasing a shifter control cable that is coupled between a shifter and the front derailleur. The control cable is often connected to one of the pivotal links to apply a torque thereto in order to move the chain guide between an extended position and a retracted position. More recently, front derailleurs have been developed the use other types of arrangements for the movable member, e.g. an electric motor arrangement, a hydraulic arrangement, etc.

As mentioned above, the bicycle front derailleur typically has a base member mounted to the seat tube of the bicycle frame. Generally, the chain cage of the front derailleur has a fixed angular orientation with respect to the base member and the bicycle frame. However, many different bicycle frames are in use today with different configurations of the seat tube. Some bicycle frames have their seat tubes slightly inclined from vertical, while other frames have their seat tubes inclined at a greater angle with respect to vertical. Thus, a problem exists with typical bicycle front derailleurs in that the angular orientation of the chain cage is fixed with respect to the base member. Specifically, since the angular orientation of the chain cage is fixed relative to the base member for most bicycle front derailleurs, the bicycle front derailleur might not be able to be installed at the optimal orientation for all bicycle frames that are currently available. Hence, several different configurations of bicycle front derailleurs are necessary to accommodate the various bicycle frame configurations that are currently available.

In view of the above, it will be apparent to those skilled in the art from this disclosure that there exists a need for an improved bicycle front derailleur that can be used on a variety of different bicycle frames. This invention addresses this need in the art as well as other needs, which will become apparent to those skilled in the art from this disclosure.

SUMMARY OF THE INVENTION

It has been discovered that by providing a simple adjustment on a bicycle front derailleur, a single bicycle front derailleur can be installed on a variety of bicycle frames.

One object of the present invention is to provide a bicycle front derailleur with an angle adjustment mechanism that allows simple adjustment of the angular orientation of a chain cage with respect to the base member of the bicycle front derailleur.

Another object of the present invention is to provide a bicycle front derailleur with a horizontal angle adjustment mechanism that allows simple adjustment of the horizontal angular orientation of a chain cage with respect to the base member of the bicycle front derailleur with the base member installed on a bicycle frame.

Yet another object of the present invention is to provide a bicycle front derailleur with a vertical angle adjustment mechanism that allows simple adjustment of the vertical angular orientation of a chain cage with respect to the base member of the bicycle front derailleur with the base member installed on a bicycle frame.

In accordance with one aspect of the present invention, a bicycle front derailleur includes a base member, a movable member, an angle adjustable plate member and a chain guide. The base member is configured to be coupled to a portion of a bicycle. The movable member has a first support side coupled to the base member and a second support side spaced from the first support side. The movable member is configured to move the second support side between a retracted position and an extended position relative to the base member. The angle adjustable plate member is coupled to the second support side for movement therewith. The chain guide includes a chain cage with the angle adjustable plate member operatively coupled to selectively adjust an angular orientation of the chain cage relative to the angle adjustable plate member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
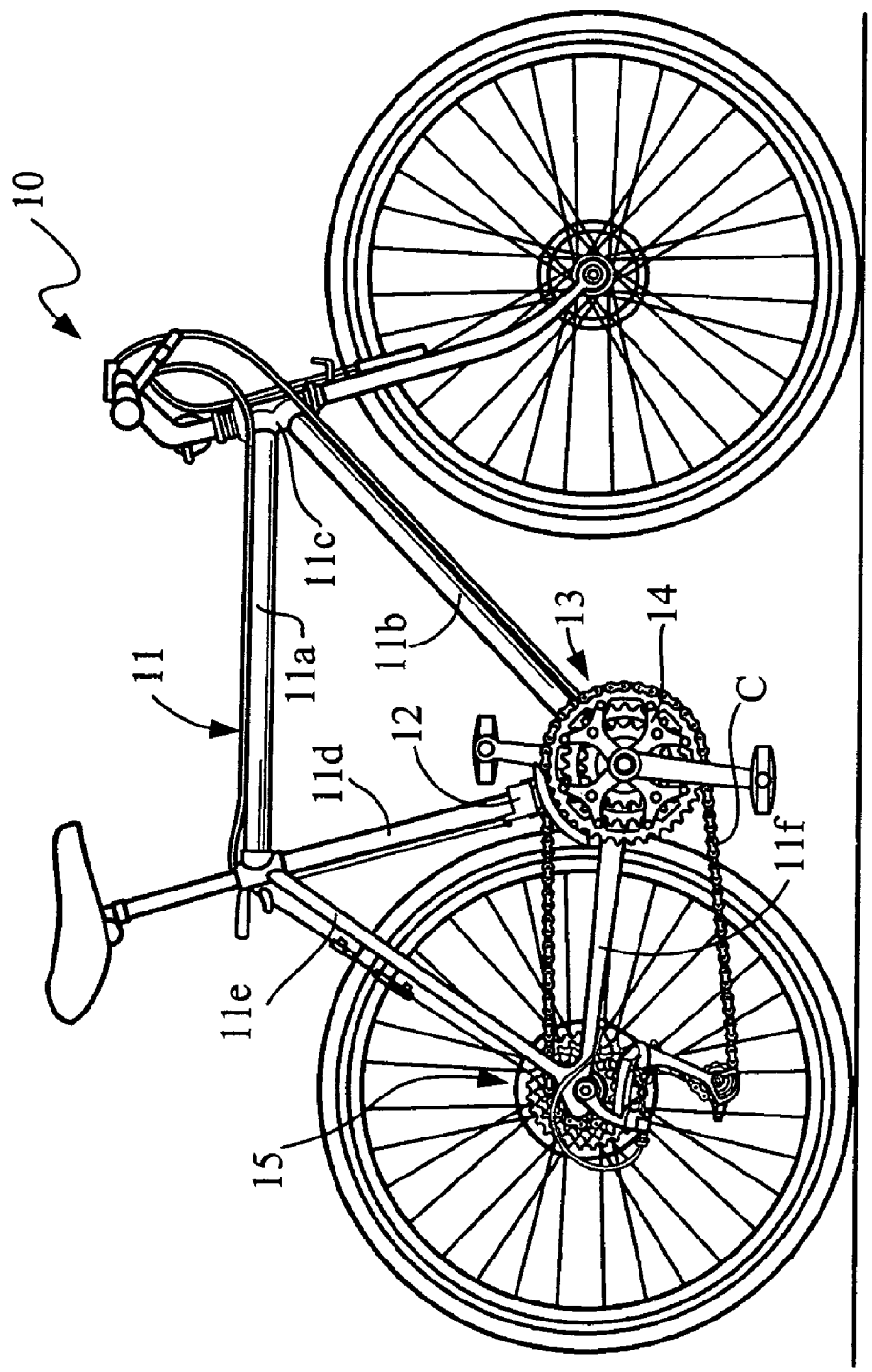
FIG. 1 is a side elevational view of a bicycle with a front derailleur installed thereon, with the front derailleur having an angle adjustment mechanism in accordance with the present invention.

Referring initially to FIG. 1, a bicycle 10 is illustrated having a bicycle frame 11 that is equipped with a bicycle front derailleur 12 in accordance with a first embodiment of the present invention. As explained below in more detail, the bicycle front derailleur 12 is configured and arranged with angular adjustments that allow selective angular positioning of the bicycle front derailleur 12 with respect to the bicycle frame 11. As used herein, the following directional terms "forward, rearward, above, downward, vertical, horizontal, below and transverse" as well as any other similar directional terms refer to those directions of a bicycle in an upright, riding position and equipped with the bicycle front derailleur 12 of the present invention. Accordingly, these terms, as utilized to describe the present invention should be interpreted relative to a bicycle in an upright, riding position and equipped with the bicycle front derailleur 12 of the present invention.

The frame 11 is basically formed by a top tube 11a, a down tube 11b, a head tube 11c, a seat tube 11d, a pair of seat stays 11e and a pair of chain stays 11f. The top tube 11a is arranged generally horizontally, while the down tube 11b is arranged below the top tube 11a such that it slants obliquely downward toward the rear of the bicycle 10. The head tube 11c joins the front ends of the top tube 11a and the down tube 11b together. The seat tube 11d extends diagonally upward and joins the rear ends of the top tube 11a and the down tube 11b together.

The bicycle 10 is also equipped with, along other components, a drive train 13 that includes the front derailleur 12. The drive train 13 also includes a chain ring assembly 14 and a rear sprocket assembly 15 that are operatively coupled together by a chain C. The front derailleur 12 is mounted to the bicycle frame 11 to shift the chain C between front sprockets or gears of the chain ring assembly 14. Since these parts of bicycle 10 are well known in the art, these parts will not be discussed or illustrated in detail herein. Moreover, other conventional bicycle parts, which are not illustrated and/or discussed herein, can also be used in conjunction with the present invention.

Figure 2:
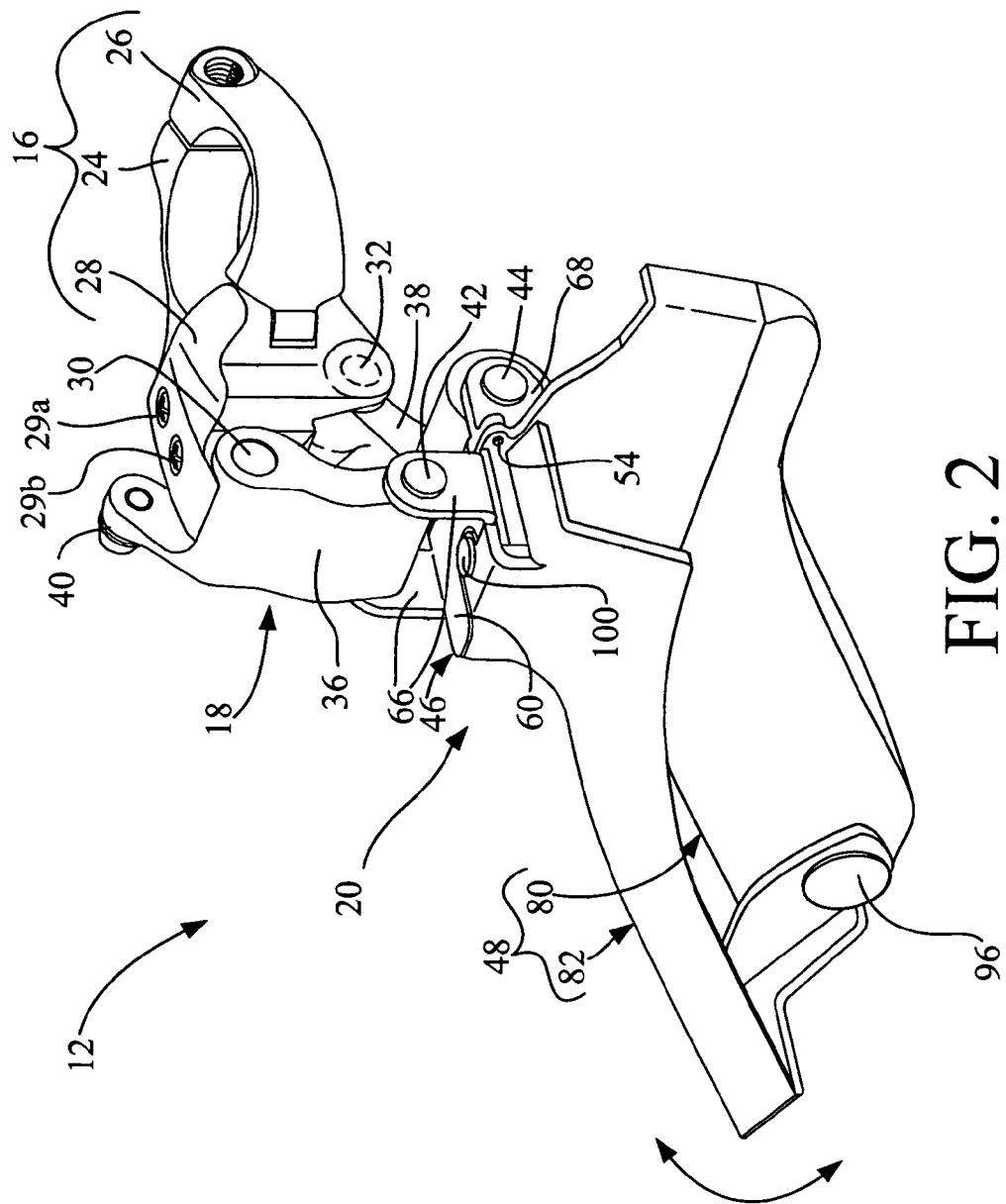
FIG. 2 is a perspective view of the front derailleur shown removed from the bicycle a first embodiment of the present invention.
Figure 3:
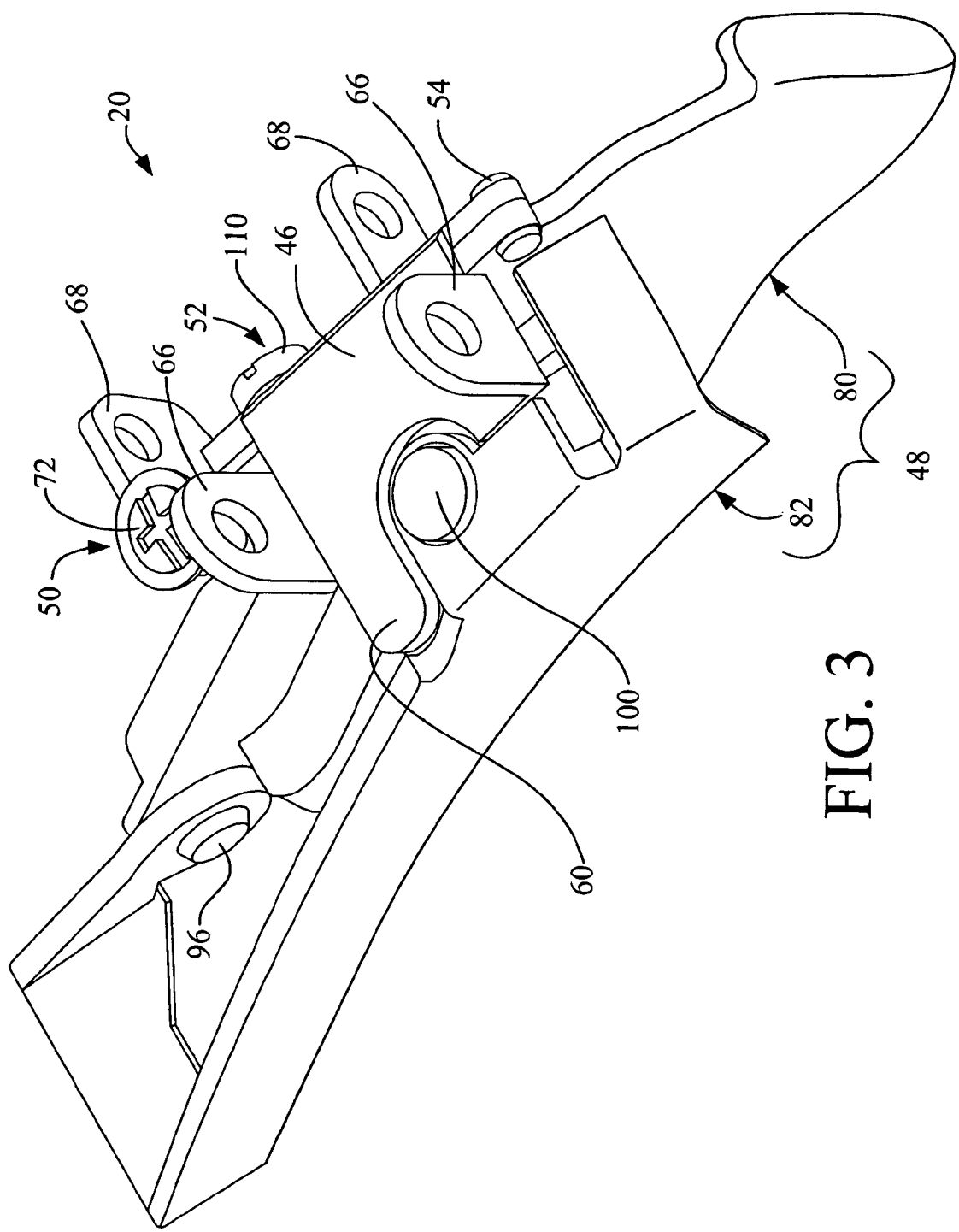
FIG. 3 is a top perspective view of upper portions of the front derailleur showing various aspects of the front derailleur with the base and moving mechanism removed in accordance with the first embodiment of the present invention.
Figure 4:
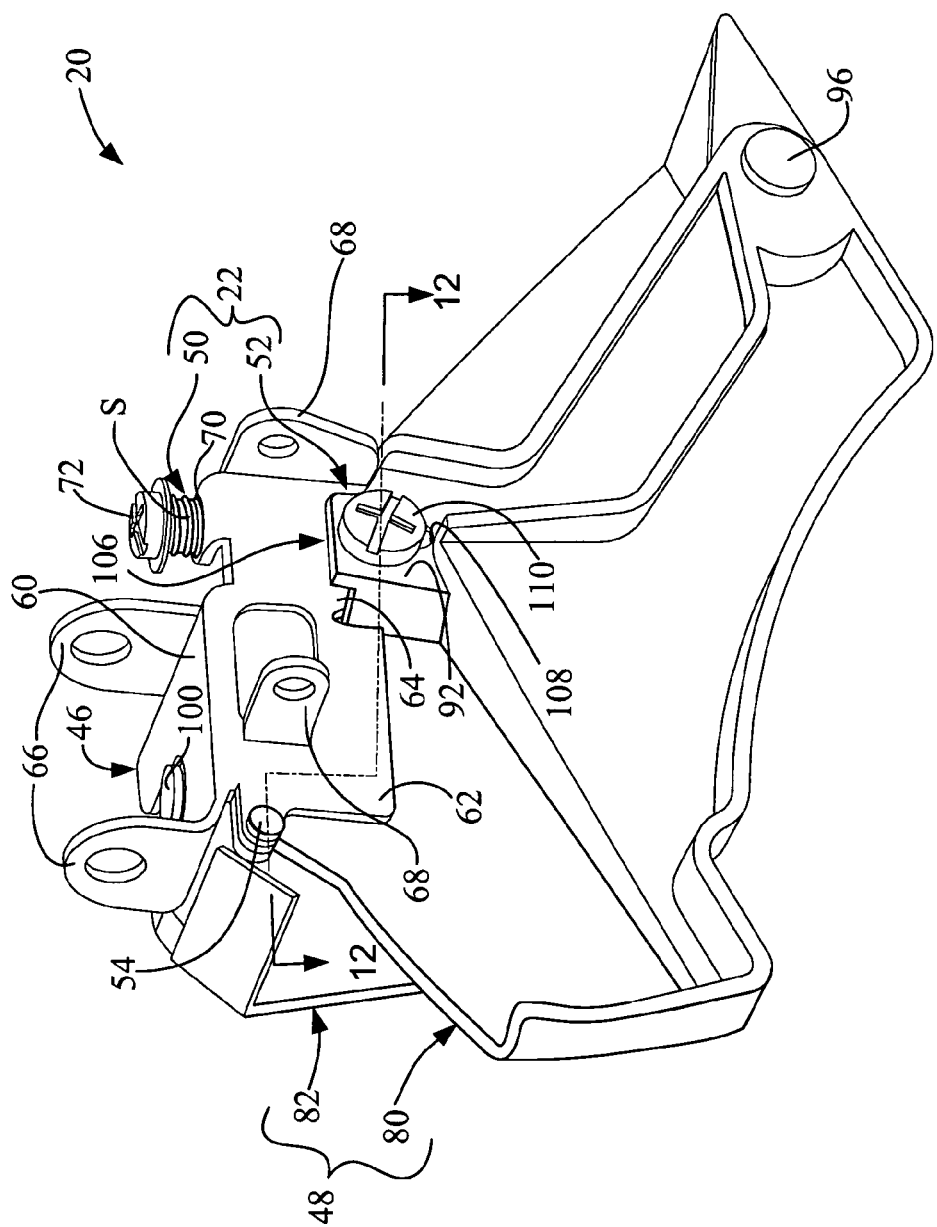
FIG. 4 is an inboard side perspective view of the front derailleur showing various aspects of the front derailleur in accordance with the first embodiment of the present invention.
Figure 5:
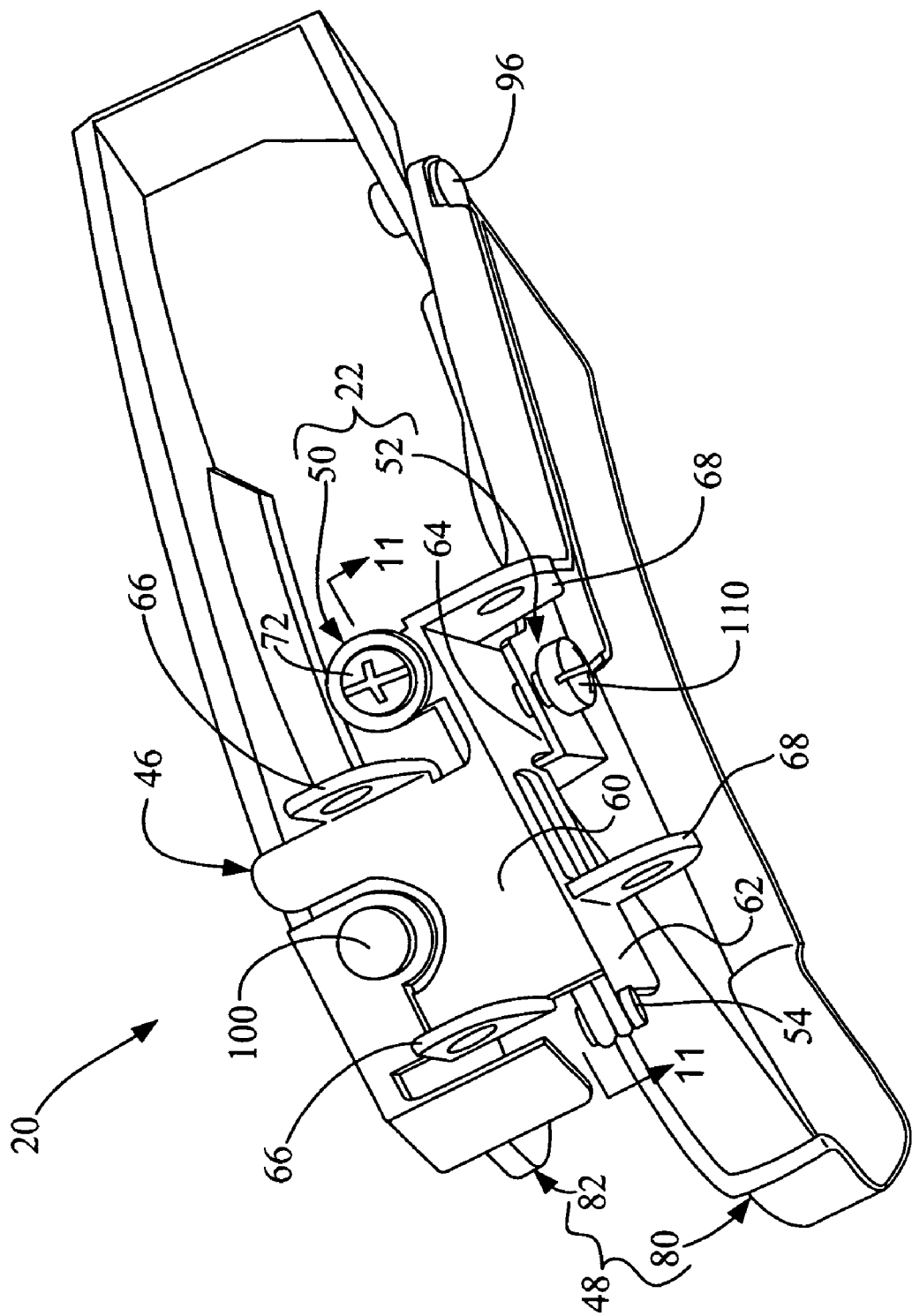
FIG. 5 is a top perspective view of upper portions of the front derailleur from an angle different from FIG. 3, showing various aspects of the front derailleur in accordance with the first embodiment of the present invention.

As shown in FIG. 2, the bicycle front derailleur 12 basically includes a base member 16, a movable member 18 and a chain guide 20 with an adjustment mechanism 22 (see FIGS. 4 and 5). The chain guide 20 is usually biased in a given direction relative to the base member 16 by a spring (not shown) in a conventional manner. These components of the front derailleur 12 are conventional components, except for the adjustment mechanism 22 of the chain guide 20. Thus, the front derailleur 12 is configured and arranged to be operated by a shifter control cable (not shown) in response operation of a shifter (not shown). The shifter control cable is connected to the movable member 18 one to apply a torque thereto in order to move the chain guide 20 between a retracted position and an extended position relative to the base member 16. In other words, the chain guide 20 is moved relative to the base member 16 by pulling and/or releasing the shifter control cable that is operatively coupled between the shifter and the front derailleur 12.

The base member 16 is configured to be coupled to the seat tube 11d of the frame 11 of the bicycle 10, as shown in FIG. 1. The base member 16 includes a pair of clamping parts 24 and 26 with the clamping part 24 having a support (fixing) body 28. The clamping parts 24 and 26 are arranged in a conventional manner for attachment to the seat tube 11d of the frame 11 of the bicycle 10. The support body 28 includes a low position adjustment screw 29a and a top position adjustment screw 29b that finely adjusts the top and low positions of the chain guide 20. In other words, the low adjustment screw 29a is configured and arranged to change the low shift position of the chain guide 20 relative to the support body 28, while the top adjustment screw 29b is configured and arranged to change the top shift position of the chain guide 20 relative to the support body 28. The support body 28 is formed with apertures (not shown) that receive generally parallel first and second pivot pins 30 and 32 in a conventional manner to pivotally support a first support side of the movable member 18. The first and second pivot pins 30 and 32 are preferably spaced apart from one another.

The movable member 18 is formed of a pair of pivotal links 36 and 38 that form a four-bar linkage together with portions of the base member 16 and the chain guide 20. Basically, movement of the movable member 18 by the shifter control cable (not shown) causes the chain guide 20 to move between a retracted position and an extended position relative to the base member 16. In other words, the chain guide 20 is moved relative to the base member 16 by pulling and/or releasing the shifter control cable that is operatively coupled between the shifter and the link 36 of the movable member 18 for selectively positioning the chain C of the bicycle 10 over one of the chain rings of the chain ring assembly 14. The first link 36 is supported for pivotal movement on the first pivot pin 30 of the support body 28. The first link 36 also includes a cable connector 40 and apertures (not shown) that receive a third pivot pin 42. The cable connector 40 is configured for connection to a shifter control cable (not shown in FIG. 2). When the cable connector 40 is pulled by movement of the shifter control cable, the chain guide 20 is moved between the retracted position and the extended position for moving the chain C of the bicycle 10 between the chain rings of the chain ring assembly 14. The third pivot pin 42 is preferably approximately parallel to the first and second pivot pins 30 and 32.

The second link 38 is supported for pivotal movement on the second pivot pin 32 of the support body 28. The second link 38 preferably pivots about the second pivot pin 32 in concert with pivoting movement of the first link 36. The second link 38 includes apertures (not shown) that receive a fourth pivot pin 44.

The ends of the first and second links 36 and 38 that pivot about the first and second pivot pins 30 and 32, respectively, define the first support side of the movable member 18. As will be made clearer in the description below, the ends of the first and second links 36 and 38 that pivot about the third and fourth pivot pins 42 and 44, respectively, define a second support side of the movable member 18 that supports the chain guide 20, in a manner described further below. Consequently, the first and second links 36 and 38 are configured to move the second support side of the movable member 18 between the retracted position and the extended position relative to the base member 16 in order to guide the chain between the chain rings of the chain ring assembly 14.

As shown in FIGS. 3 through 7, the chain guide 20 basically includes an adjustment plate 46, a chain cage 48, the adjustment mechanism 22 which includes a vertical angle adjustment mechanism 50 and a horizontal angle adjustment mechanism 52 and a pivot pin 54. As described in greater detail below, the chain cage 48 is pivotally attached or coupled to the adjustment plate 46 via the pivot pin 54. In other words, the chain cage 48 is configured for pivotal movement about the pivot pin 54 relative to the adjustment plate 46. The pivotal movement of the chain cage 48 about the pivot pin 54 (a vertical angular orientation) is controlled by the vertical angle adjustment mechanism 50, as described below. As also described in greater detail below, the horizontal angle adjustment mechanism 52 controls a horizontal angular orientation of the chain cage 48 relative to the adjustment plate 46.

Figure 8:
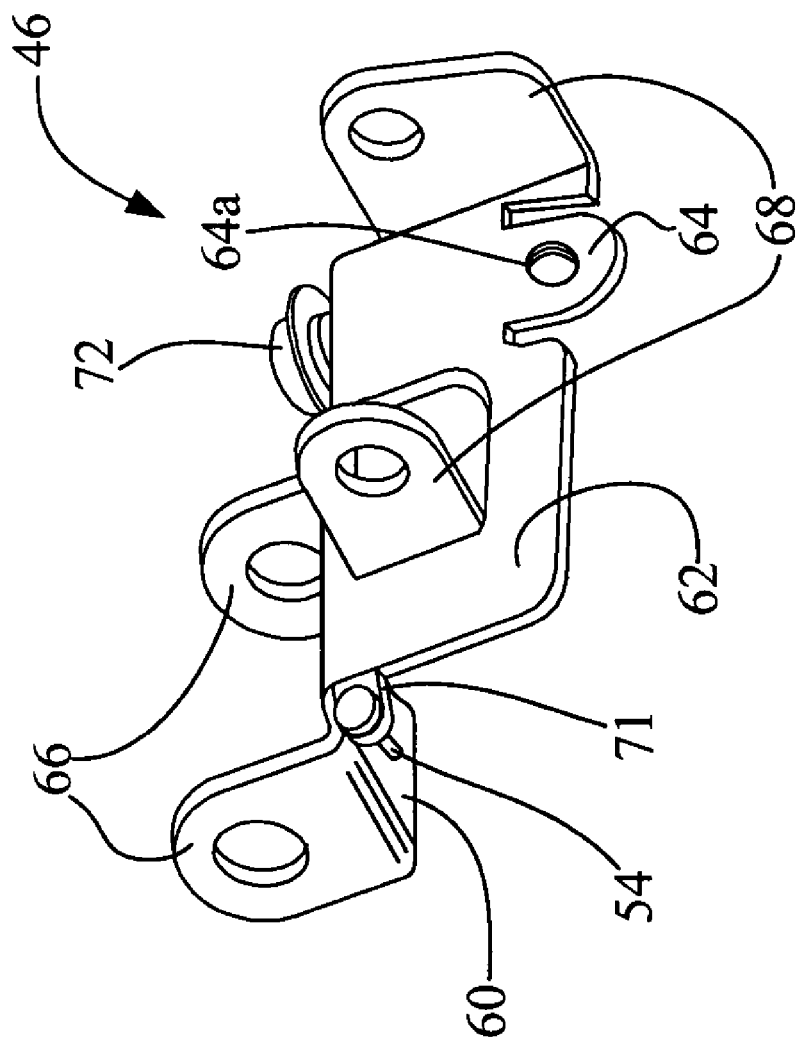
FIG. 8 is a perspective view of the adjustment plate in accordance with the first embodiment of the present invention.
Figure 11:
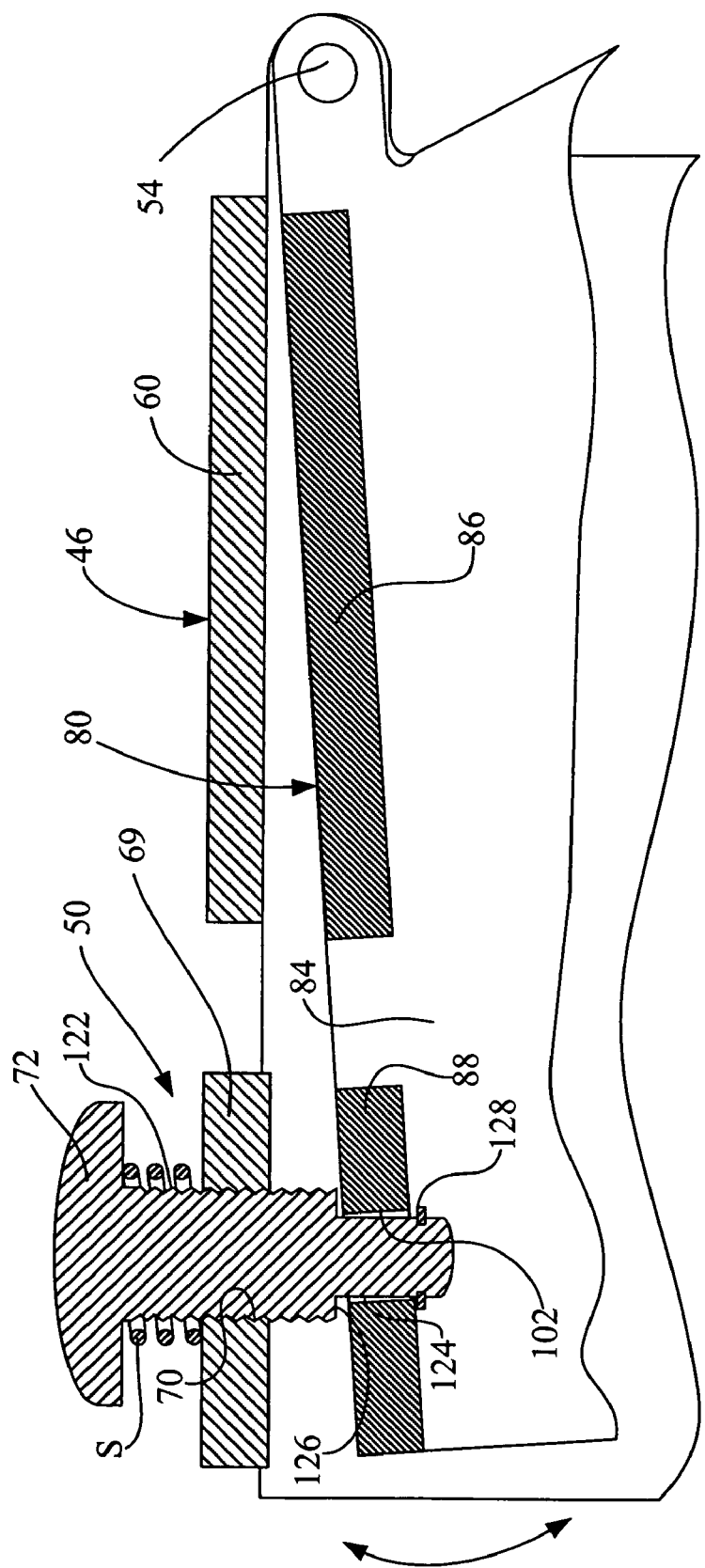
FIG. 11 is a cross-sectional view of the chain cage taken along the lines 11-11 in FIG. 5 to show features of a vertical angular adjustment mechanism in accordance with the first embodiment of the present invention.

As shown more clearly in FIGS. 5, 8 and 11, the adjustment plate 46 is formed unitarily as a single member with a horizontal wall portion 60, a vertical wall portion 62, a vertical projection 64, a pair of first pivot pin supports 66, a pair of second pivot pin supports 68, a support flange 69 (shown in FIGS. 6 and 11), an adjuster screw aperture 70 (shown in FIG. 11) and a pivot support 71. An adjuster screw 72 (a first adjuster) is installed in the adjuster screw aperture 70. The adjustment plate 46 is preferably made of a metallic material but can alternatively be formed of a polymer material, a composite material or other suitable non-metallic material as needed and/or desired.

As shown in FIG. 2, the first pivot pin supports 66 are flanges that are pivotally supported on the third pivot pin 42, while the second pivot pin supports 68 are flanges that are pivotally supported on the fourth pivot pin 44. Consequently, the adjustment plate 46 moves with the second support side of the movable member 18. The adjuster screw aperture 70 (shown in FIG. 11) and the first adjuster screw 72 are described in greater detail below after a description of the chain cage 48.

As shown in FIGS. 3-7, the chain cage 48 basically includes an inner cage plate 80 and an outer cage plate 82. The inner cage plate 80 and the outer cage plate 82 are preferably made of a metallic material, but can alternatively be formed of a polymer material, a composite material or other suitable non-metallic material as needed and/or desired.

Figure 7:
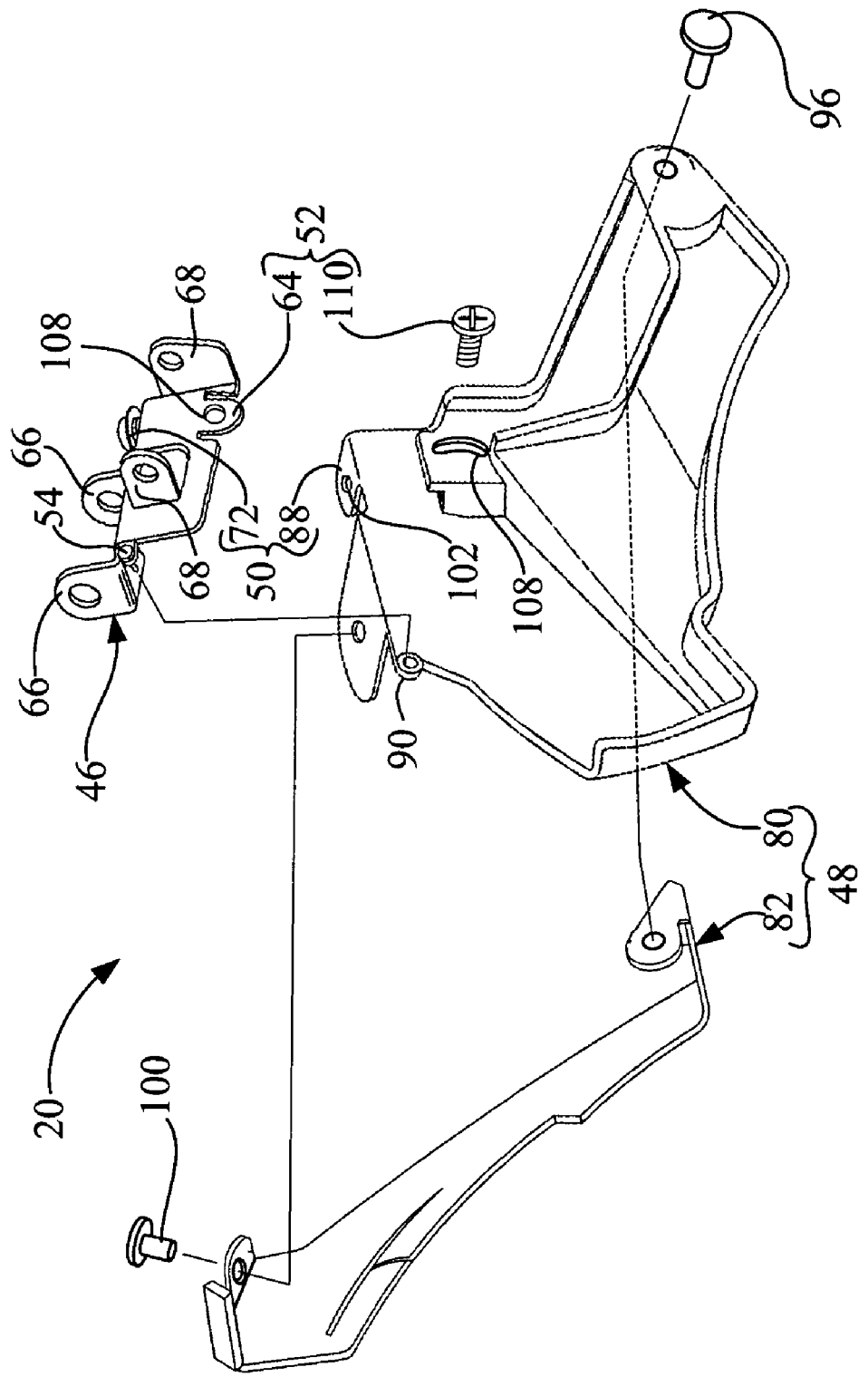
FIG. 7 is an exploded perspective view of the front derailleur showing an adjustment plate, an inner cage plate of a chain cage and an outer cage plate of the chain cage in accordance with the first embodiment of the present invention.
Figure 9:
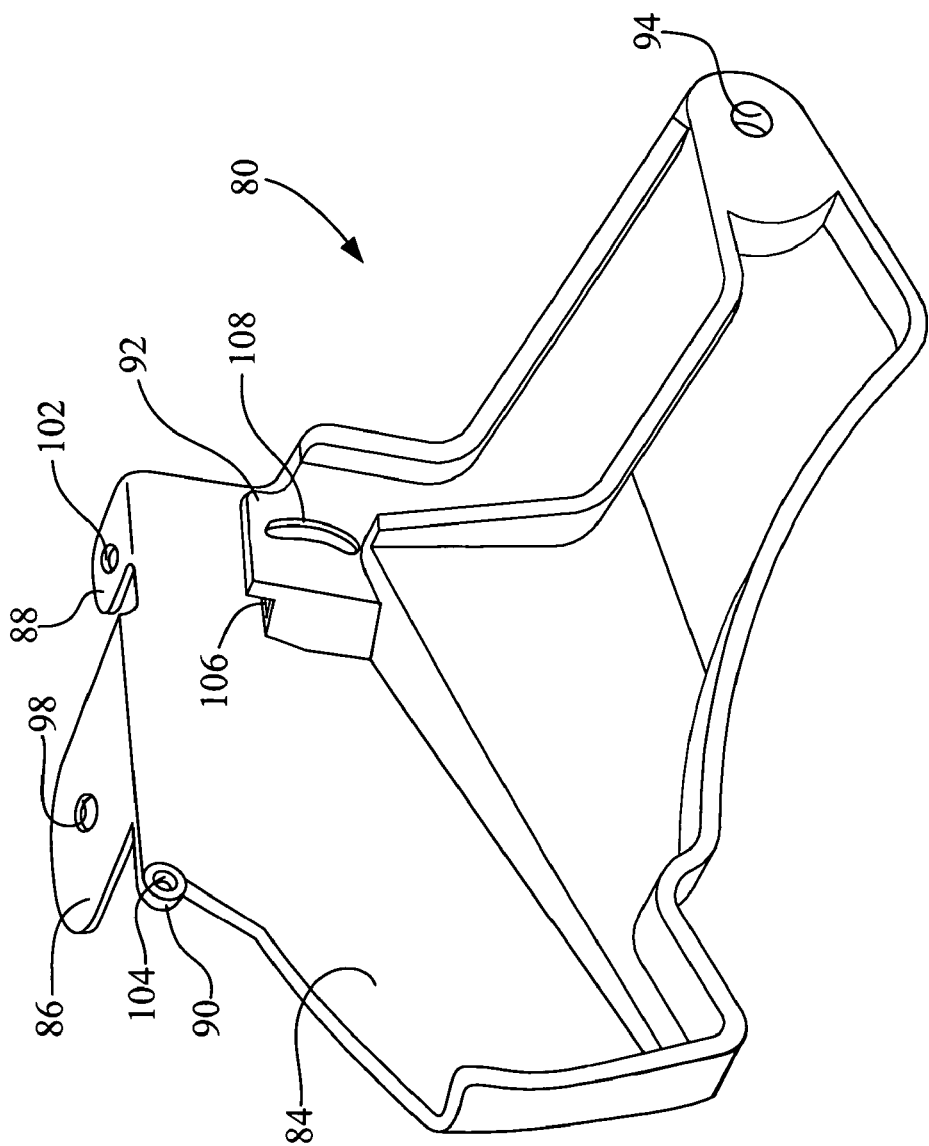
FIG. 9 is a perspective view of the inner cage plate of the chain cage in accordance with the first embodiment of the present invention.

With reference now to FIG. 9, the inner cage plate 80 is now described in greater detail. The inner cage plate 80 basically includes a main body 84, a first projection or flange 86, a second projection or flange 88, a pivot support 90 and a pocket wall 92. With the bicycle front derailleur 12 installed on the bicycle 10, the main body 84 is preferably held in a generally vertical orientation. The main body 84 is formed with a first attachment aperture 94 for fastening the outer cage plate 82 to the inner cage plate 80. As indicated in FIG. 7, a first fastener 96 fixes the outer cage plate 82 to the inner cage plate 80. The first fastener 96 can be a threaded screw, rivet or other fastening element as needed and/or desired.

With reference again to FIG. 9, the first projection 86 is preferably unitarily formed with the main body 84. The first projection 86 preferably extends in a direction generally perpendicular to the main body 84. The first projection 86 is preferably lies approximately in a horizontal orientation or can be slightly angularly offset from horizontal. As described in greater detail below, the orientation of the first projection 86 relative to horizontal (and relative to the horizontal wall portion 60 of the adjustment plate 46) is adjusted by the vertical angle adjustment mechanism 50.

The first projection 86 is also formed with a second attachment aperture 98. The second attachment aperture 98 is provided to fasten the outer cage plate 82 to the inner cage plate 80. As indicated in FIG. 7, a second fastener 100 also fixes the outer cage plate 82 to the inner cage plate 80. The second fastener 100 can be a threaded screw, rivet or other fastening element as needed and/or desired.

Referring again to FIG. 9, the second projection 88 extends in a direction that is generally parallel to the first projection 86 but can be slightly offset from the first projection 86. The second projection 88 is formed with a first adjuster aperture 102. The adjuster aperture 102 is configured to receive a portion of the first adjuster screw 72 thereby forming a portion of the vertical angle adjustment mechanism 50, as described in greater detail below.

The pivot support 90 is formed with a pivot pin aperture 104 that receives the pivot pin 54 such that the outer cage plate 82 pivots about the pivot pin 54 relative to the adjustment plate 46.

Figure 6:
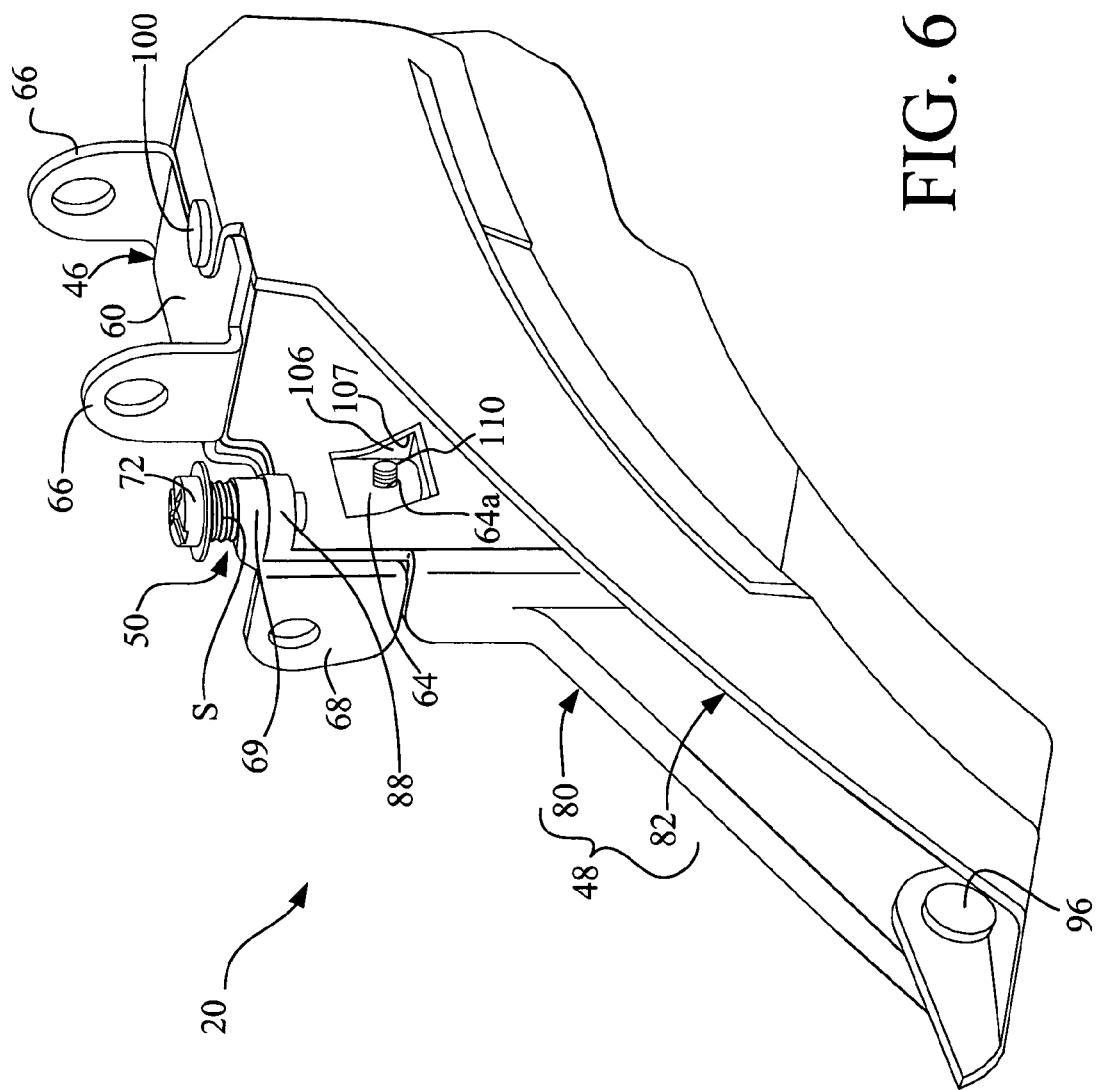
FIG. 6 is an outboard side perspective view of the front derailleur showing various aspects of the front derailleur in accordance with the first embodiment of the present invention.
Figure 12:
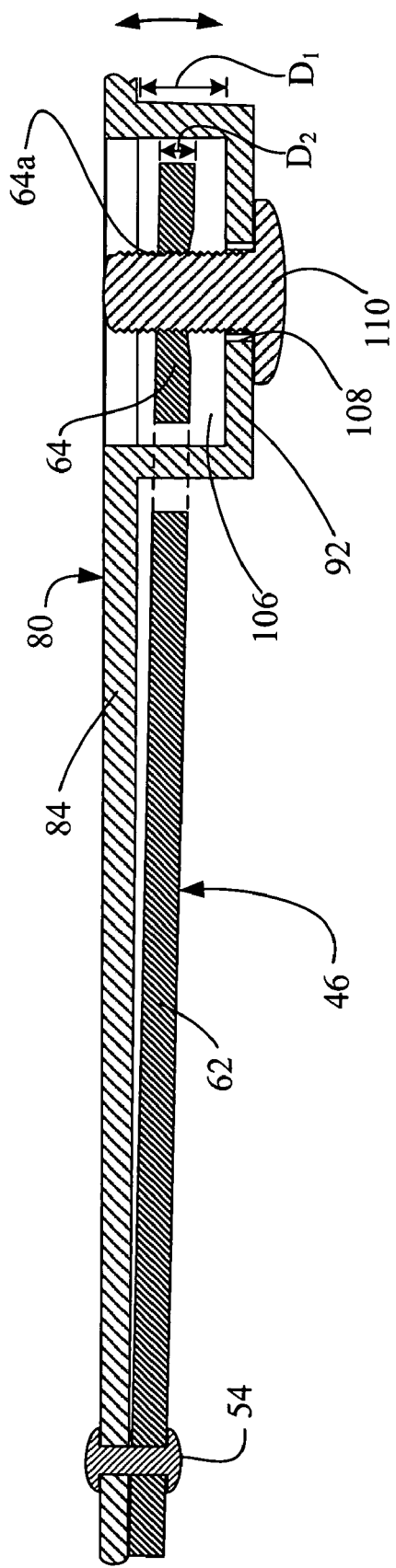
FIG. 12 is a cross-sectional view of the chain cage taken along the lines 12-12 in FIG. 4 to show features of a horizontal angular adjustment mechanism in accordance with the first embodiment of the present invention.

The pocket wall 92 is formed on the main body 84 of the inner cage plate 80. As shown in FIG. 12, the pocket wall 92 defines a recess or pocket 106. Specifically, the pocket 106 is formed between a portion of the main body 84 and the pocket wall 92. As shown in FIG. 6, an opening 107 can optionally be formed in the main body 84 that is open to the pocket 106 thereby showing a portion of the vertical projection 64. The pocket wall 92 also has an elongated arcuate shaped aperture or slot 108. The slot 108 has an arcuate shape with a center that coincides with the pivot pin 54. A second adjuster screw 110 (a second adjuster) extends through the slot 108 of the pocket wall 92, where it is threaded into a second adjuster aperture 64a (shown in FIG. 12) that is formed in the vertical projection 64. The second adjuster aperture 64a is preferably a threaded hole that receives the second adjuster screw 110 (a second adjuster) to change the horizontal orientation of the chain cage 48 relative to the adjustment plate 46. Thus, the second adjuster aperture 64a and the second adjuster screw 110 form a portion of the horizontal angle adjustment mechanism 52, as described in greater detail below.

As indicated in FIGS. 4-6 and 12, the vertical projection 64 extends into the pocket wall 92. In the normal rest position with the second adjuster screw 110 removed, the vertical wall portion 62 is bent so that a gap is formed between the vertical wall portion 62 and the inner cage plate 84 at the point of the horizontal angle adjustment mechanism 52. The vertical wall portion 62 and/or the inner cage plate 84 has sufficient flexibility such that they can be resiliently bent relative to each other by the second adjuster screw 110 to change the horizontal orientation of the chain cage 48 relative to the adjustment plate 46. Thus, by threading the second adjuster screw 110 into the second adjuster aperture 64a, the vertical projection 64 is pulled towards the pocket wall 92 causing the vertical wall portion 62 and/or the inner cage plate 84 to be resiliently bent. With specific reference to FIG. 12, the pocket 106 has a width $D_1$. The vertical projection 64 has a thickness $D_2$. As indicated in FIG. 12, the width $D_1$ is several times larger than the thickness $D_2$. Therefore, the vertical projection 64 can undergo movement in the direction of the measured width $D_1$ within the pocket 106.

Figure 10:
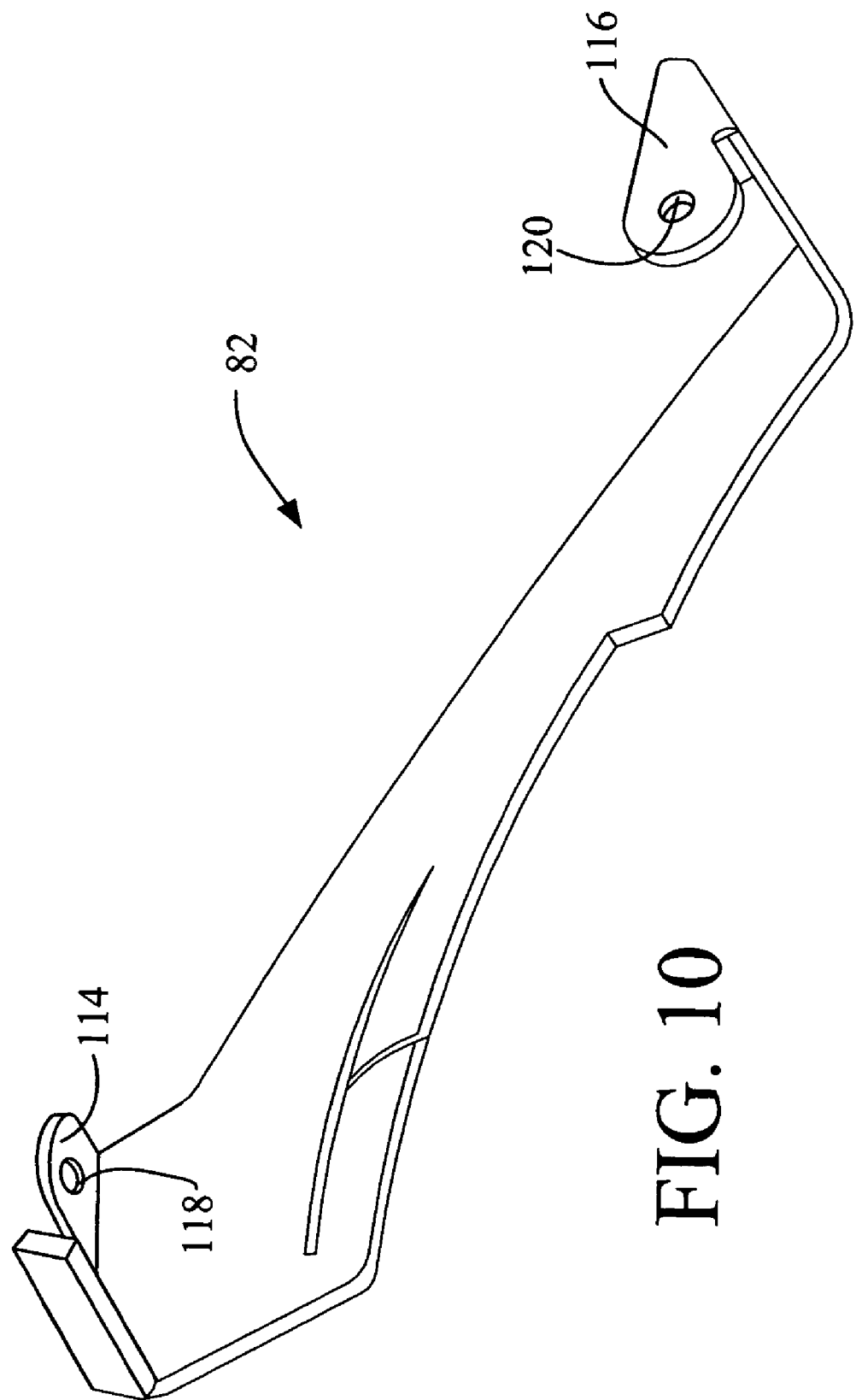
FIG. 10 is a perspective view of the outer cage plate of the chain cage in accordance with the first embodiment of the present invention.

With reference to FIG. 10, the outer cage plate 82 is now described in greater detail. The outer cage plate 82 is formed with a first flange 114 and a second flange 116. The first flange 114 is formed with a third attachment aperture 118 and the second flange 116 is formed with a fourth attachment aperture 120. The third attachment aperture 118 is preferably a threaded hole that receives the second fastener 100. The fourth attachment aperture 118 is preferably a threaded hole that receives the first fastener 96. Consequently, the first and second fasteners 96 and 100 fix the inner cage plate 80 to the outer cage plate 82 to form the chain guide 20. Hence, the inner cage plate 80 and the outer cage plate 82 move together as a single unitary structure. Since the inner cage plate 80 is mechanically attached to the adjustment plate 46 via the pivot pin 54, the chain guide 20 (the inner cage plate 80 and the outer cage plate 82) pivots about the pivot pin 54 with respect to the adjustment plate 46.

With specific reference to FIG. 11, a description of the vertical angle adjustment mechanism 50 is now provided. As mentioned above, the vertical angle adjustment mechanism 50 includes the first adjuster screw 72. The first adjuster screw 72 includes a threaded portion 122, a shaft portion 124, a shoulder portion 126 and a ring clip 128 (or E-clip). The threaded portion 122 is threaded into the adjuster screw aperture 70 of the support flange 69 of the adjustment plate 46. The shaft portion 124 extends into and through the first adjuster aperture 102 in the second projection 88. The first adjuster aperture 102 is not threaded, and therefore, the first adjuster screw 72 rotates freely therein. The shoulder portion 126 has a diameter larger than the first adjuster aperture 102. The ring clip 128 is any of a variety of clips or arcuate members that can be attaches proximate the distal end of the first adjuster screw 72. The ring clip 128 has a diameter larger than the first adjuster aperture 102. Therefore, the second projection 88 of the inner cage plate 80 of the chain cage 48 is confined between the shoulder portion 126 and the ring clip 128. Consequently, as the first adjuster screw 72 is rotated, the second projection 88 and the remainder of the chain cage 48 to pivot about the pivot pin 54 relative to the adjustment plate 46 and the base member 16. Therefore, rotating the first adjuster screw 72 provides vertical orientation adjustment of the chain cage 48. A spring S is disposed about the threaded portion 122 in engagement between the support flange 69 and the first adjuster screw 72. The spring S holds the first adjuster screw 72 in place against unintended rotation. Since the movable member 18 maintains the adjustment plate 46 at a generally consistent angular orientation relative to the base member 16, the vertical angle adjustment mechanism 50 also provides a simple adjustment of the vertical orientation of the chain cage 48 relative to the base member 16.

With specific reference to FIG. 12, a description of the horizontal angle adjustment mechanism 52 is now provided. As mentioned above, the horizontal angle adjustment mechanism 52 includes the second adjuster aperture 64a and the second adjuster screw 110. The second adjuster screw 110 is threaded into the second adjuster aperture 64a in the vertical projection 64 of the adjustment plate 46 to change the horizontal orientation of the chain cage 48 relative to the adjustment plate 46. In particular, the second adjuster screw 110 extends through the slot 108 of the pocket wall 92 into the pocket 106 formed by the pocket wall 92, and is then threadedly engaged with the second adjuster aperture 64a of the vertical projection 64 of the adjustment plate 46.

Initially, portions of the vertical wall portion 62 and the vertical projection 64 of the adjustment plate 46 are shaped to be offset or spaced apart from the main body 84 of the inner cage plate 80 in a direction extending away from the pivot pin 54. The spacing between the vertical wall portion 62 and the vertical projection 64 of the adjustment plate 46 and the main body 84 of the inner cage plate 80 can be accomplished in any of a variety of ways. For instance, the vertical wall portion 62 of the adjustment plate 46 can be provided with a slight arcuate shape such that moving away from the pivot pin 54 the vertical wall portion 62 gradually extends away from the main body 84 of the inner cage plate 80.

Consequently, as the second adjuster screw 110 is threaded into the second adjuster aperture 64a in the vertical projection 64, the second adjuster screw 110 pulls the vertical projection 64 towards the pocket wall 92 of the inner cage plate 80. Since the pivot pin 54 fixes the pivot support 71 of the adjustment plate 46 and the pivot support 90 of the inner cage plate 80 together, the adjustment plate 46 and/or the inner cage plate 80 bends slightly as the second adjuster screw 110 is threaded into the second adjuster aperture 64a. When the second adjuster screw 110 is unthreaded from the second adjuster aperture 64a in the vertical projection 64, the second adjuster screw 110 releases the vertical projection 64 such that resiliency between the vertical wall portion 62 and/or the inner cage plate 80 biases the vertical projection 64 away the pocket wall 92 of the inner cage plate 80. Therefore, by rotating the second adjuster screw 110, it is possible to adjust the horizontal orientation of the chain cage 48 relative to the adjustment plate 46. Since the movable member 18 maintains the adjustment plate 46 at a generally consistent angular orientation relative to the base member 16, the horizontal angle adjustment mechanism 52 provides a simple adjustment of the horizontal orientation of the chain cage 48 relative to the base member 16. In other words, in this way, the horizontal orientation of the chain cage 48 can be easily adjusted relative to the frame 11 after the front derailleur 12 has been attached to the frame 11.

Second Embodiment

Figure 13:
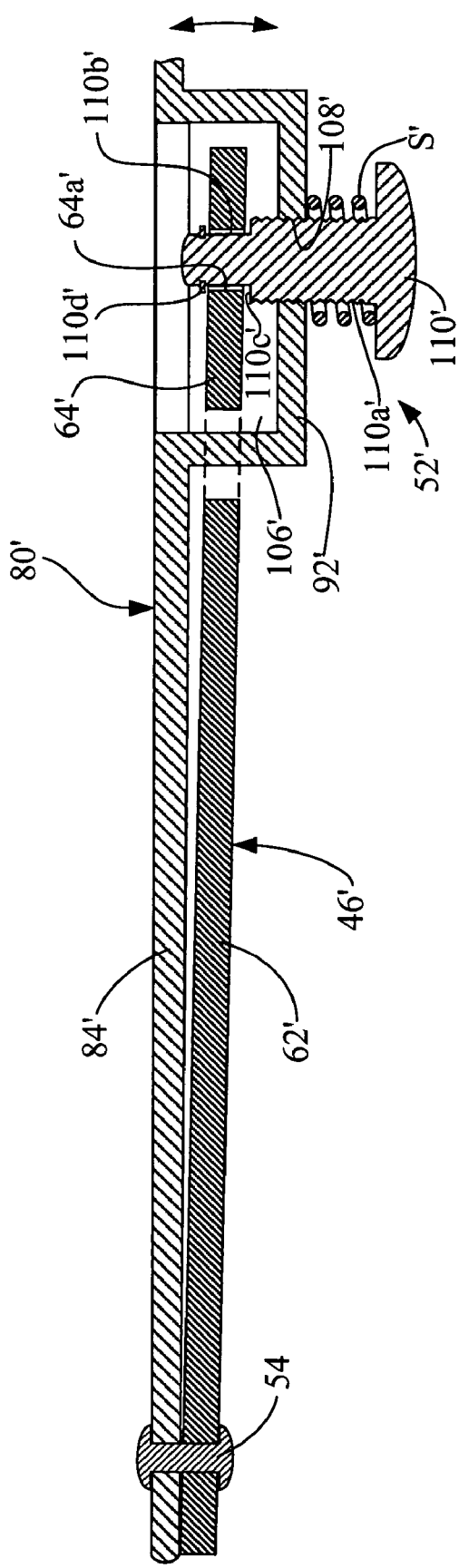
FIG. 13 is a cross-sectional view, similar to FIG. 12, of the chain cage to show features of a horizontal angular adjustment mechanism in accordance with a second embodiment of the present invention.
Figure 14:
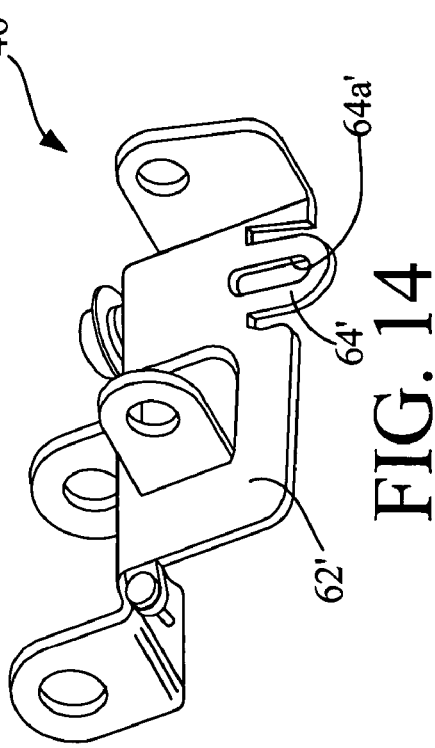
FIG. 14 is a perspective view, similar to FIG. 8, of an adjustment plate of the horizontal angular adjustment mechanism in accordance with the second embodiment of the present invention.

Referring now to FIGS. 13 and 14, a modified horizontal angle adjustment mechanism 52' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

The horizontal angle adjustment mechanism 52' of the second embodiment differs from the first embodiment in that a modified adjustment plate 46' replaces the adjustment plate 46 of the first embodiment, a modified inner cage plate 80' replaces the inner cage plate 80 of the first embodiment, and a second adjuster screw 110' replaces the second adjuster screw 110 of the first embodiment. In other words, the adjustment plate 46, the inner cage plate 80 and the second adjuster screw 110 of the front derailleur 12 are replaced with the modified adjustment plate 46', the modified inner cage plate 80' and the modified second adjuster screw 110' such that they cooperate with the remaining parts of the front derailleur 12 of the first embodiment. Thus, unless otherwise specified, description of the parts of the front derailleur 12 applies to this second embodiment.

The adjustment plate 46' is generally identical to the adjustment plate 46 of the first embodiment, except that an elongated arcuate shaped aperture or slot 64a' is formed in a vertical projection 64'. The slot 64a' has an arcuate shape with a center that coincides with the pivot pin 54. The vertical projection 64' is generally the same as the vertical projection 64 of the first embodiment, except for the inclusion of the slot 64a' instead of the second adjuster aperture 64a.

The modified inner cage plate 80' is generally identical to the inner cage plate 80 of the first embodiment, except that for the inclusion of a threaded second adjuster aperture 108' instead of the slot 108.

The second adjuster screw 110' includes a threaded portion 110a', a shaft portion 110b', a shoulder portion 110c' and a ring clip 110d' (or E-clip). The threaded portion 110a' is threaded into the second adjuster aperture 108' in the pocket wall 92' of the inner cage plate 80'. The shaft portion 110b' extends within the pocket 106' of the pocket wall 92' into and through the slot 64a' in the vertical projection 64'. The slot 64a' is not threaded and therefore the second adjuster screw 110' rotates freely therein. A spring S' is disposed about the threaded portion 110a' in order to retain the second adjuster screw 110' place and prevent unintended rotation.

The shoulder portion 110c' has a diameter larger than the slot 64a'. The ring clip 110d' is any of a variety of clips or arcuate members that can be attaches proximate the distal end of the second adjuster screw 110'. The ring clip 110d' has a diameter larger than the width of the slot 64a'. Therefore, the vertical projection 64' is confined between the shoulder portion 110c' and the ring clip 110d'. Consequently, as the second adjuster screw 110' is rotated, the main body 84' of the inner cage plate 80' (and the chain cage as a whole) is moved with respect to the vertical projection 64' and the vertical wall portion 62' of the adjustment plate 46'. Since the pivot pin 54 fixes the pivot support of the adjustment plate 46' and the pivot support of the inner cage plate 80' together, the adjustment plate 46' and/or the inner cage plate 80' bend slightly as the second adjuster screw 110' is rotated within the second adjuster aperture 108. Therefore, by rotating the second adjuster screw 110' it is possible to adjust the horizontal orientation of the chain cage relative to the adjustment plate 46'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage pivotally mounted to the angle adjustable plate member by a pivot pin to move about a connection point which directly connects the chain cage to the angle adjustable plate member; and
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member,
wherein the first adjuster is coupled between the adjustable plate member and the chain cage to selectively adjust the angular orientation of the chain cage relative to the angle adjustable plate member in a first direction by pivoting the chain cage about the pivot pin.

2. The bicycle front derailleur as set forth in claim 1, wherein
the chain cage is adjustably connected to the angle adjustable plate member by the first adjuster in a vertical angular orientation of the chain cage relative to the angle adjustable plate member when the base member in an installed orientation.

3. The bicycle front derailleur as set forth in claim 1, wherein
the chain cage is adjustably connected to the angle adjustable plate member by the first adjuster in a horizontal angular orientation of the chain cage relative to the angle adjustable plate member when the base member in an installed orientation.

4. The bicycle front derailleur as set forth in claim 1, wherein
the first adjuster includes an adjusting screw operatively coupled between the angle adjustable plate member and the chain cage to adjust the angular orientation of the chain cage relative to the angle adjustable plate member.

5. The bicycle front derailleur as set forth in claim 4, wherein
one of the angle adjustable plate member and the chain cage includes a first threaded hole that is threadedly engaged with the adjusting screw, and the other of the angle adjustable plate member and the chain cage includes a first non threaded hole that contains the adjusting screw.

6. The bicycle front derailleur as set forth in claim 1, wherein
the angle adjustable plate member further includes at least one mounting flange pivotally coupled to the first and second link members.

7. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage pivotally mounted to the angle adjustable plate member by a pivot pin to move about a connection point which directly connects the chain cage to the angle adjustable plate member; and
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member, wherein
the first adjuster is coupled between the adjustable plate member and the chain cage to selectively adjust the angular orientation of the chain cage relative to the angle adjustable plate member in a first direction by bending either the chain cage or the angle adjustable plate member about the pivot pin.

8. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage adjustably supported on the angle adjustable plate member to move about a connection point;
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member; and
a second adjuster operatively arranged between the angle adjustable plate member and the chain cage at a location that is spaced apart from the connection point,
the first adjuster including a first adjusting screw operatively coupled between the angle adjustable plate member and the chain cage to adjust the angular orientation of the chain cage relative to the angle adjustable plate member in a first direction, and
the second adjuster including a second adjusting screw that is coupled between the angle adjustable plate member and the chain cage to adjust the angular orientation of the chain cage relative to the angle adjustable plate member in a second direction.

9. The bicycle front derailleur as set forth in claim 8, wherein
the angle adjustable plate member includes a first adjusting hole with the first adjusting screw disposed therein and a second adjusting hole with the second adjusting screw disposed therein.

10. A bicycle front comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage adjustably supported on the angle adjustable plate member to move about a connection point;
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member; and a second adjuster operatively arranged between the angle adjustable plate member and the chain cage at a location that is spaced apart from the connection point, the chain cage being pivotally mounted to the angle adjustable plate member by a pivot pin, the first adjuster being coupled between the adjustable plate member and the chain cage to selectively adjust the angular orientation of the chain cage relative to the angle adjustable plate member in a first direction by pivoting the chain cage about the pivot pin, and the second adjuster being coupled between the adjustable plate member and the chain cage to selectively adjust the angular orientation of the chain cage relative to the angle adjustable plate member in a second direction that is perpendicularly arranged relative to the first direction by bending either the chain cage or the angle adjustable plate member about the pivot pin.

11. The bicycle front derailleur as set forth in claim 10, wherein
the first adjuster includes a first adjusting screw operatively coupled between the angle adjustable plate member and the chain cage, and
the second adjuster includes a second adjusting screw operatively coupled between the angle adjustable plate member and the chain cage.

12. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage adjustably supported on the angle adjustable plate member to move about a connection point;
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member; and
a second adjuster operatively arranged between the angle adjustable plate member and the chain cage at a location that is spaced apart from the connection point, with the second adjuster being movable to selectively adjust a horizontal angular orientation of the chain cage relative to the angle adjustable plate member when the base member is in the installed orientation,
the first adjuster being movable to selectively adjust a vertical angular orientation of the chain cage relative to the angle adjustable plate member when the base member in an installed orientation.

13. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage adjustably supported on the angle adjustable plate member to move about a connection point;
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member; and
a second adjuster operatively arranged between the angle adjustable plate member and the chain cage at a location that is spaced apart from the connection point,
the first adjuster being coupled between the adjustable plate member and the chain cage to adjust the angular orientation of the chain cage relative to the angle adjustable plate member in a first direction and the second adjuster being coupled between the adjustable plate member and the chain cage to adjust the angular orientation of the chain cage relative to the angle adjustable plate member in a second direction that is perpendicularly arranged relative to the first direction.

14. A bicycle front derailleur comprising:
a base member configured to be coupled to a portion of a bicycle;
a first link member having a first end movably coupled to the base member;
a second link member having a first end movably coupled to the base member, the first and second link members having second ends that are spaced from the first ends of the first and second link members, with the second ends of the first and second link members being movable between a retracted position and an extended position relative to the base member;
an angle adjustable plate member coupled to the second ends of the first and second link members for movement therewith between the retracted and extended positions;
a chain cage adjustably supported on the angle adjustable plate member to move about a connection point;
a first adjuster operatively arranged between the angle adjustable plate member and the chain cage at a location that is spaced apart from the connection point, with the first adjuster being movable to selectively adjust an angular orientation of the chain cage relative to the angle adjustable plate member by movement of the first adjuster relative to the angle adjustable plate member, with the angular orientation of the chain cage relative to the angle adjustable plate member being adjusted according to an amount of the movement of the first adjuster relative to the angle adjustable plate member; and a second adjuster operatively arranged between the angle adjustable plate member and the chain cage at a location that is spaced apart from the connection point, with the second adjuster including an additional adjusting screw that is movable to selectively adjust the angular orientation of the chain cage relative to the angle adjustable plate member when the base member is in the installed orientation, the first adjuster including an adjusting screw operatively coupled between the angle adjustable plate member and the chain cage to adjust the angular orientation of the chain cage relative to the angle adjustable plate member, one of the angle adjustable plate member and the chain cage including a first threaded hole that is threadedly engaged with the adjusting screw, and the other of the angle adjustable plate member and the chain cage including a first non threaded hole that contains the adjusting screw, and one of the angle adjustable plate member and the chain cage including a second threaded hole that is threadedly engaged with the additional adjusting screw, and the other of the angle adjustable plate member and the chain cage includes a second non threaded hole that contains the additional adjusting screw.

* * * * *